(12) United States Patent
Akimoto et al.

(10) Patent No.: US 6,324,961 B1
(45) Date of Patent: Dec. 4, 2001

(54) OIL PASSAGE ARRANGEMENT IN A PISTON

(75) Inventors: Yoshiaki Akimoto; Hideo Ueshima; Yukihiro Noguchi; Hideaki Miyashita, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,937

(22) Filed: Feb. 18, 2000

(30) Foreign Application Priority Data

Feb. 22, 1999 (JP) .................................................. 11-043228

(51) Int. Cl.[7] .................................................. F01B 31/10
(52) U.S. Cl. .................................................. 92/160
(58) Field of Search ....................................... 92/160, 238

(56) References Cited

U.S. PATENT DOCUMENTS

| | | | |
|---|---|---|---|
| 1,605,040 | * 11/1926 | Kreis | 92/160 |
| 1,953,109 | * 4/1934 | Heron | 92/160 X |
| 2,108,194 | * 2/1938 | Church | 92/160 |
| 2,695,824 | * 11/1954 | Klingel, Jr. | 92/160 |
| 4,794,848 | * 1/1989 | Melchoir | 92/160 X |
| 6,152,016 | * 11/2000 | Bahr et al. | 92/160 |
| 6,205,908 | * 3/2001 | Kumai et al. | 92/160 |

FOREIGN PATENT DOCUMENTS 61-35716  10/1986  (JP) .

* cited by examiner

*Primary Examiner*—John E. Ryznic
(74) *Attorney, Agent, or Firm*—Armstrong, Westerman, Hattori, McLeland & Naughton, LLP

(57) ABSTRACT

Oil passages 12 for lubricating and cooling a piston pin 10 are provided in such a manner as to each open to an oil ring groove 5 of a piston 1 and to a piston inner side surface 2b of a piston pin supporting part 2 at portions in the vicinity of an upper end of a piston-pin hole 2a through the piston pin supporting part 2. The oil passages 12 are provided diagonally relative to an axis of the piston-pin hole 2a.

18 Claims, 5 Drawing Sheets

OIL PASSAGE ARRANGEMENT IN A PISTON

BACKGROUND OF THE INVENTION

1. Field of the Invention

The present invention relates to an oil passage arrangement in a piston for use in an engine.

2. Description of the Related Art

Conventionally, a piston pin is assembled to a piston for use in an engine for connecting a connecting rod to the piston. With a view to lubricating and cooling the piston pin, an oil passage is provided which extends from an oil ring groove formed in the piston to the interior of the piston so that a lubricating oil clinging to the inner wall of a cylinder is supplied to the piston pin. A piston provided with an oil passage as described above is represented by one disclosed in Japanese Utility Model Examined Publication No. Sho. 61-35716.

In the oil passage arrangement of the piston disclosed in the cited Publication, however, since there is provided a single oil passage extending from the oil ring groove formed in the piston to an uppermost end portion of a piston-pin hole supporting therein the piston pin, although a certain cooling effect can be expected, this means that the oil passage is formed in the piston pin supporting part which is adapted to carry a great magnitude of explosion load, and this may cause a risk of the rigidity of the piston being deteriorated. Also, the distance between the piston head part and the piston-pin hole becomes long and this causes a problem of the piston being made larger, and such a construction is not suitable for a piston head in particular for a high speed engine.

SUMMARY OF THE INVENTION

To solve these problems, it is an object to provide an oil passage arrangement which realizes improvements in cooling performance of a piston pin, as well as in reduction in size and weight of a piston.

To attain the above object, according to the present invention, there is provided an oil passage arrangement in a piston (1) with an oil passage (12) extending from an oil ring groove (5) formed in an outer circumferential surface of the piston (1) to a piston inner side surface (2b) of a piston-pin supporting part (2) through which a piston-pin hole (2a) is formed for insertion of a piston pin (10) therethrough at a portion situated on a side of an upper end portion of the piston-pin hole (2a) through the interior of the piston pin supporting part (2), so that a lubricating oil collected in the oil ring groove (5) is supplied to the piston pin (10).

According to this construction, since the lubricating oil is supplied to the upper end portion of the piston pin, it is possible to improve the cooling effect on the piston pin, and in addition, since the oil passage is made open to the interior of the piston at a position other than a position directly above the upper end portion of the piston-pin hole, there is no risk of a reduction in thickness at the piston pin supporting part above the piston-pin hole and hence no risk of reduction in rigidity thereat, thereby making it possible to make the piston compact.

Further, the oil path (12) may be formed at portions situated on sides of the upper end portion of the piston-pin hole (2a), and the respective oil passages are provided diagonally relative to an axis of the piston-pin hole (2a) in such a manner as to be directed toward a central part of the piston (1), and this facilitates the formation of the oil passages. Moreover, the construction allows to a sufficient amount of lubricating oil to be supplied toward the central part of the interior of the piston, and this allows the lubricating oil to be supplied to the upper end portion of the piston pin which needs lubricating and cooling without necessity of making the oil passages to be opened directly above the piston pin in a preferred fashion.

DETAILED DESCRIPTION OF THE PREFERRED EMBODIMENTS

A mode for carrying out the invention will be described in detail below based on an embodiment illustrated in the accompanying drawings.

Figure 1:
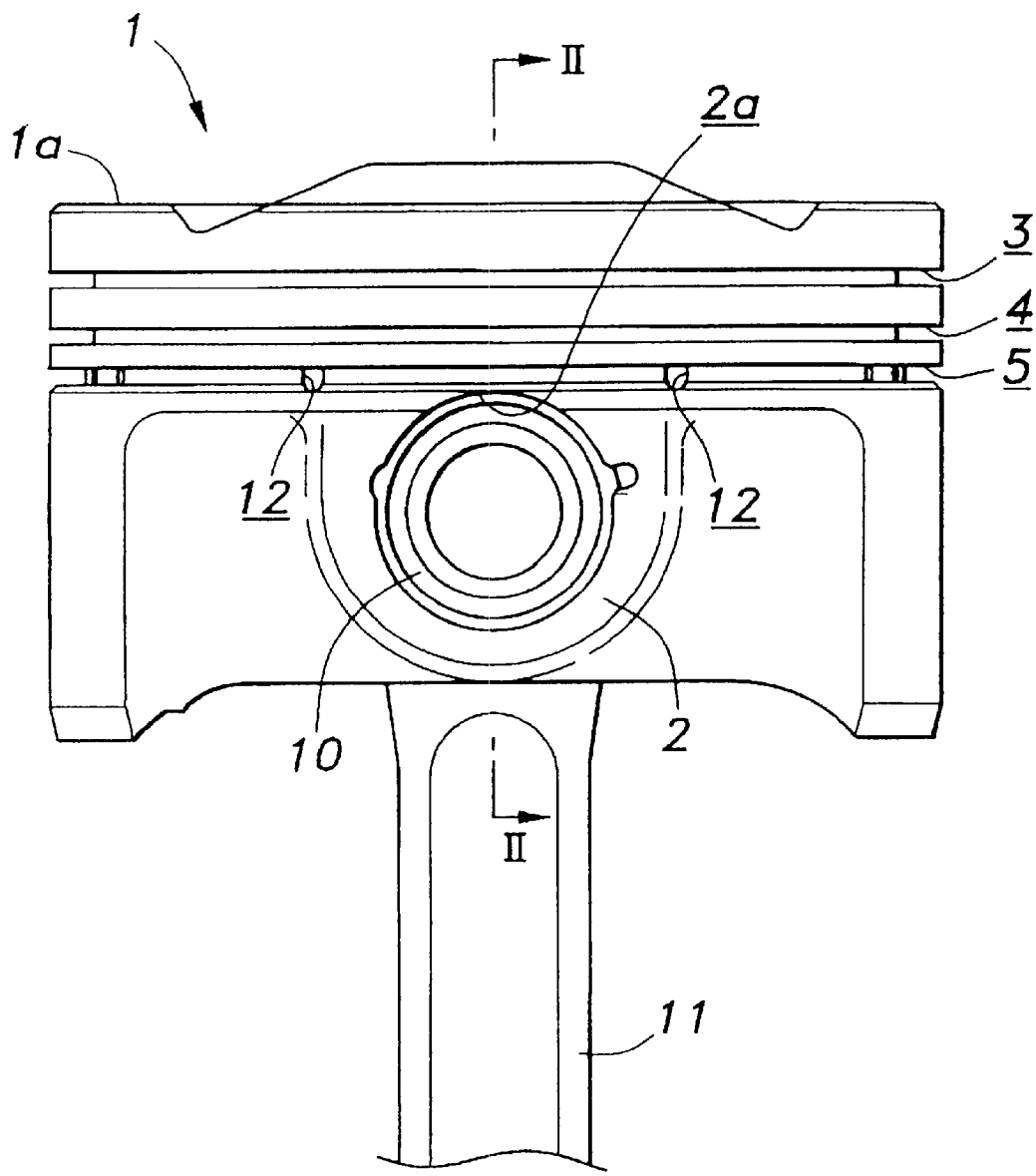
FIG. 1 is a front view showing a piston for use in an engine according to the present invention.
Figure 2:
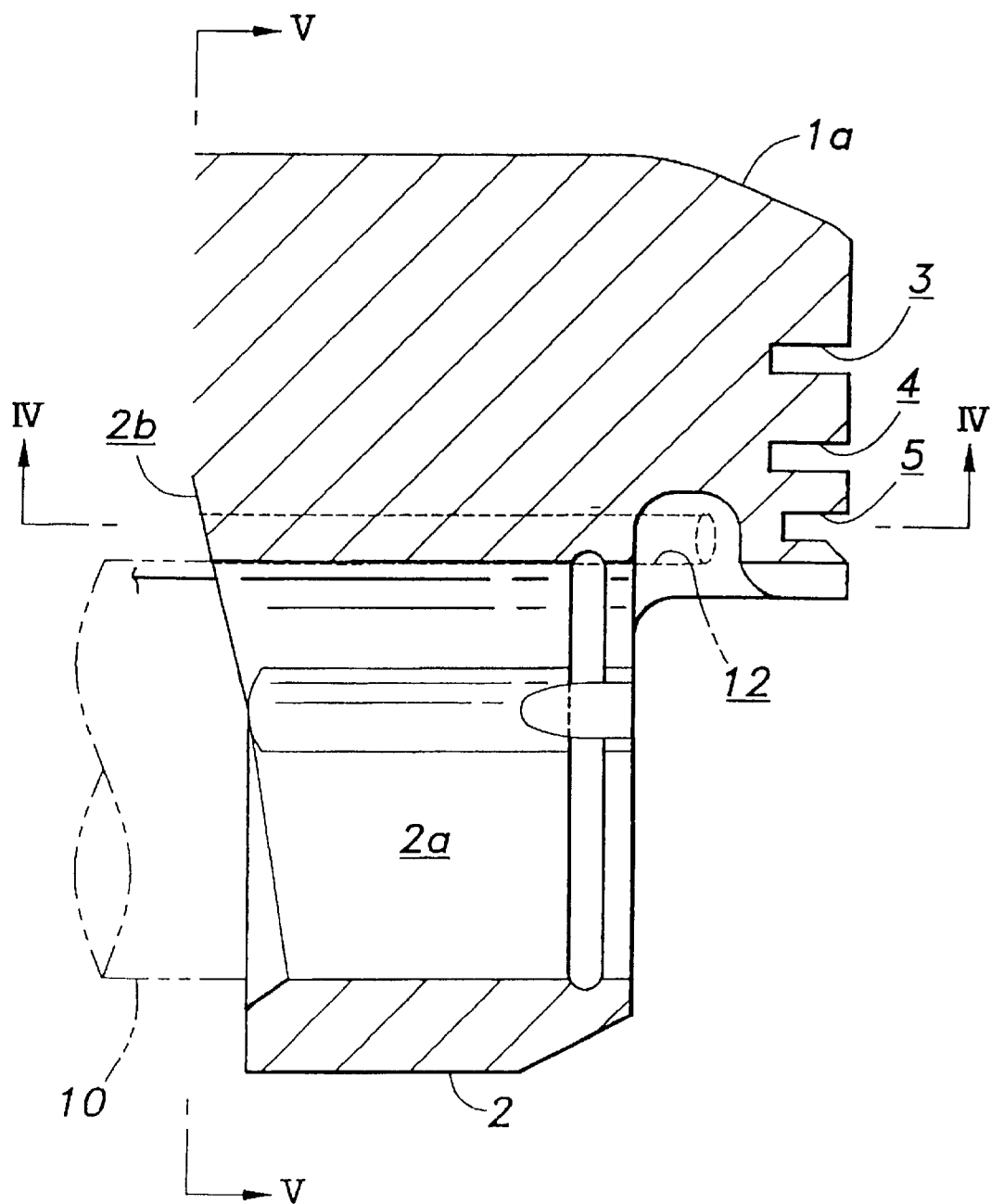
FIG. 2 is an enlarged sectional view of a main part of the piston taken along the line II—II in FIG. 1.

FIG. 1 is a front view of a piston 1 for use in an engine to which the invention is applied, and FIG. 2 is an enlarged sectional view of a main part of the piston taken along the line II—II in FIG. 1. Provided on the piston 1 are a piston head 1a and a pair of piston pin supporting parts 2 (only one of the pair is shown in FIG. 2) in such a manner as to protrude from a back side of the piston head 1a which is opposite to a combustion chamber side thereof.

Figure 3:
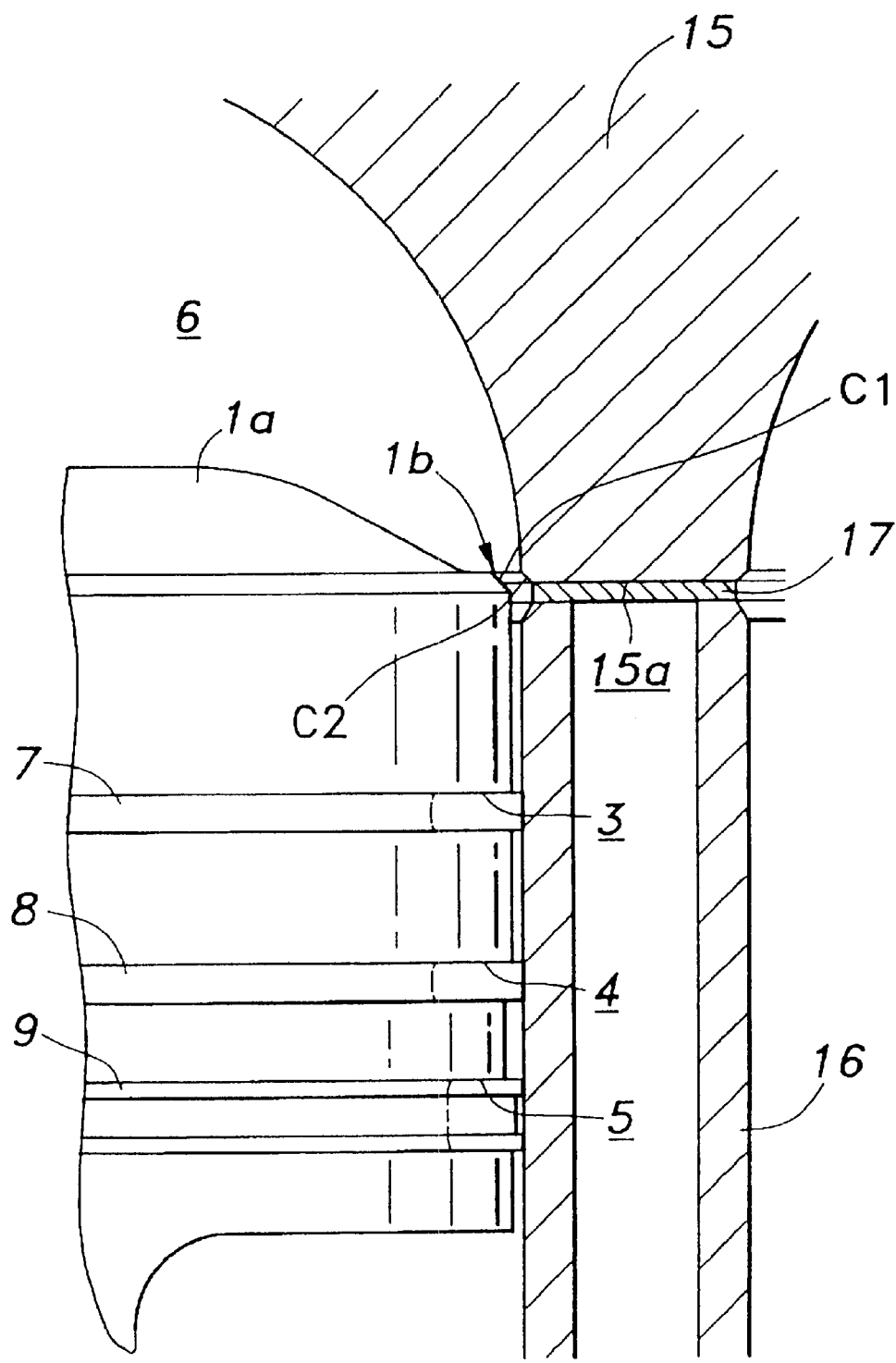
FIG. 3 is a partially enlarged side view showing a state in which the piston is situated at a top dead center.

Three ring grooves 3, 4, 5 are formed in the outer circumferential surface of the piston head 1a in such a manner as to be spaced away from each other at predetermined intervals in an axial direction of the piston. As shown in FIG. 3, compression rings 7, 8 are mounted, respectively, in the two ring grooves 3, 4 positioned on the combustion chamber 6 side (upper side in the figure) and an oil ring 9 is mounted in the ring groove 5 as an oil ring groove on the crankshaft side (lower side in the figure).

A pin hole 2a is provided in the piston pin supporting part 2 which has an inside diameter allowing a piston pin 10 to be inserted therethrough, and end portions of the piston pin 10 are supported at the two piston pin supporting parts 2. A small end of a connecting rod 11 is securely press fitted in an intermediate portion exposed between the two piston pin supporting parts 2.

As for an lubricating oil for lubricating and cooling the piston pin 10, the lubricating oil clinging to the inner wall surface of a cylinder is scraped off by the oil ring 9 for collection, and the lubricating oil that has flowed into the ring groove 5 is sent into the piston 1 so as to be supplied to the piston pin 10. In the piston 1 according to the invention, an oil passage 12 for distribution of the lubricating oil is provided in such a manner as to extend from the ring groove 5 to a piston inner side surface 2b of the piston pin supporting part 2 through the interior of the piston pin supporting part 2 at substantially the same level as the ring groove 5 with respect to the axial direction of the piston 1.

Figure 4:
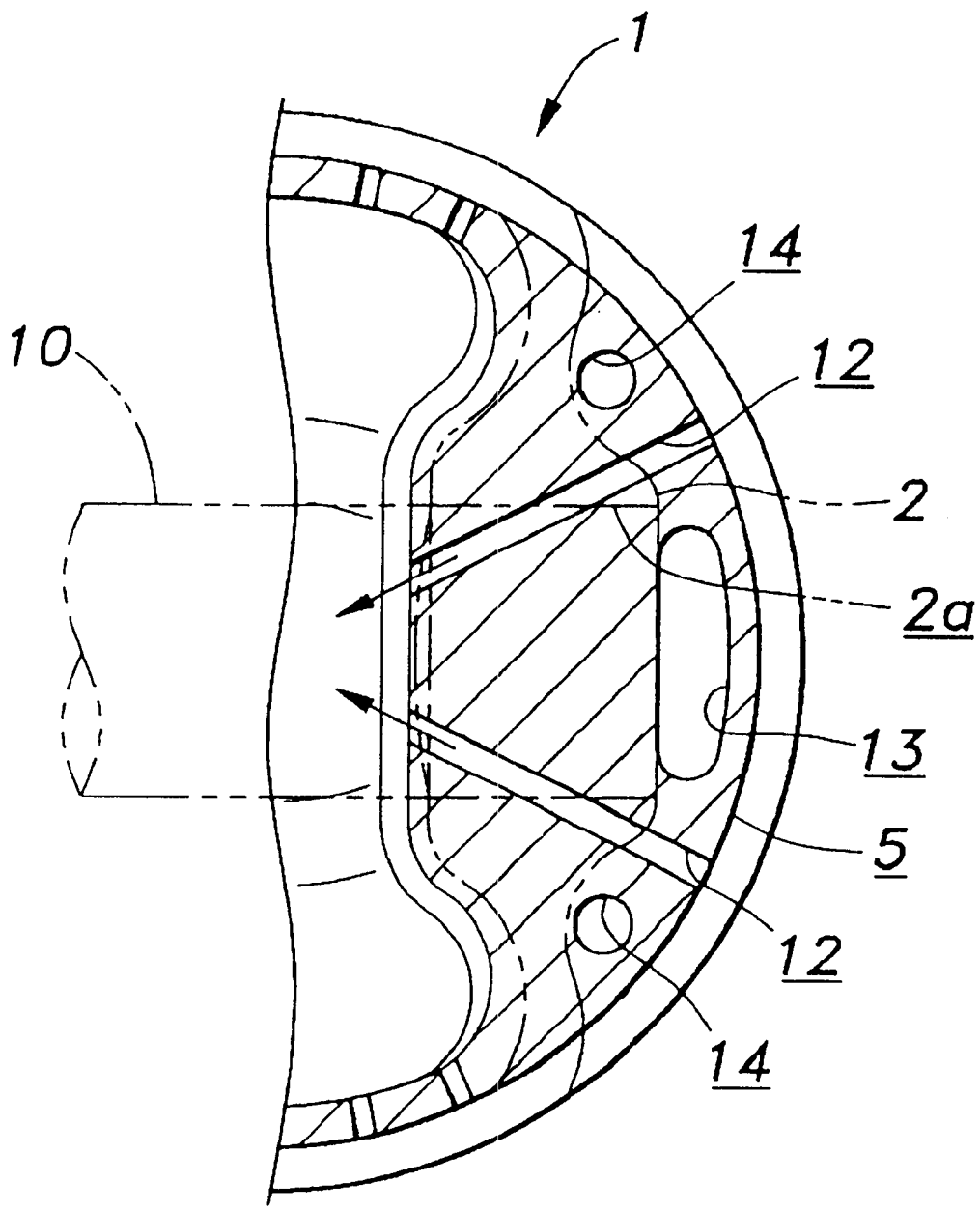
FIG. 4 is a sectional view of the main part taken along the line IV—IV in FIG. 2.
Figure 5:
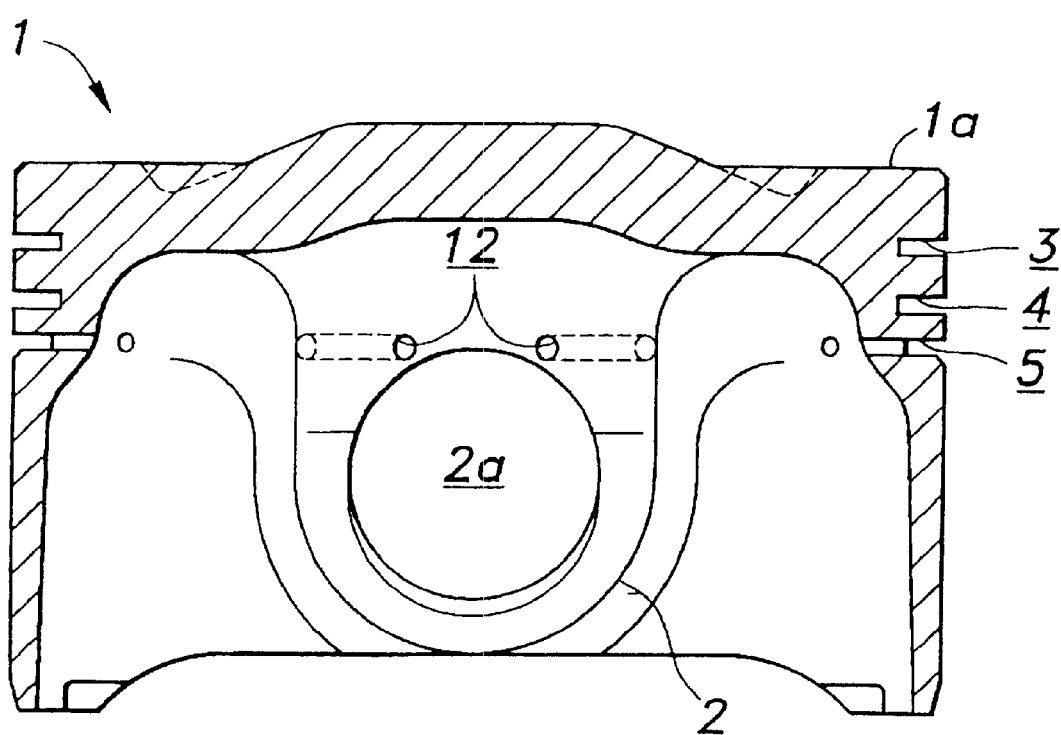
FIG. 5 is a sectional view taken along the line V—V in FIG. 2.

As well illustrated in FIG. 4, two oil passages 2 are provided for each piston supporting part 12. As described above, an end of the oil passage 12 is made open to the ring groove 5 and the other end to the piston inner side surface 2b of the piston pin supporting part 2. As shown in FIG. 5, the other ends of the oil passages 12 are situated in the vicinity of sides of the upper end (the combustion chamber 6 side) of the piston-pin hole 2a. In other words, the oil passages 12 are provided, respectively, at portions situated on the sides of the upper end portion of the piston-pin hole 2a in the piston inner side surface 2b of the piston pin supporting part 2. Moreover, the respective oil passages 12 are provided diagonally with respect to the axis of the piston-pin hole 2a so as to be directed toward the central portion of the piston and are eventually made open in the piston inner side surface 2b. In the illustrated embodiment, the two oil passages 12 are disposed at transversely symmetrical positions so as to form two converging lines. Accordingly, an inner end portion of the oil passage 12 is provided directly above the piston-pin hole 2a, while an outer end of the oil passage 12 is provided at a position other than a position situated directly above the piston-pin hole 2a. In addition, another two oil passages are disposed in the other piston pin supporting part (not shown) in a similar fashion.

In these oil passages 12 formed as described above, since lubricating oil to be distributed through the oil passages 12 is supplied in a sufficient amount toward the central part inside the piston, as shown by arrows in FIG. 4, the lubricating oil can be supplied in a preferred fashion to the upper end portion of the piston pin 10 that needs lubricating and cooling without making the oil passages open directly above the piston pin 10.

Furthermore, in a case where the oil passage is made to open directly above the upper end of the piston-pin hole 2a or where the oil passage is provided in the vicinity of the piston-pin hole 2a along the axis thereof, the thickness of the piston needs to be increased in order to secure the required rigidity. With the oil passage 12 according to the present invention, however, there is provided only the opening on the inner side of the piston 1 at the portion above the piston-pin hole 2a where the thickness is made relatively thinner. As shown in FIG. 4, too, the oil passages 12 become farther from the piston-pin hole 2a as they extend toward the ring groove 5, and therefore the required rigidity can be secured without increasing the thickness in the axial direction of the piston 1. Moreover, in the illustrated embodiment, the lower end of the oil passage 12 is situated lower than the upper end of the piston-pin hole 2a with respect to the axial direction of the piston 1, thus this improving the miniaturization of the piston further. Consequently, it is possible to make the piston 1 compact, and the piston 1 made so compact can preferably be used as a piston suitable for a high speed engine.

In addition, as shown in FIG. 4, excess metal at portions other than those where the oil passages 12 are formed is cut away in such a manner as to form recessed portions 13, 14 at appropriate positions on both sides of each oil passage 12 so as to hold the oil passage 12 therebetween, whereby the weight of the piston 1 is reduced. The recessed portion 13 resulting from cutting away of excess metal is provided in the outside of said piston pin supporting part 2 at a position interposed between said oil passages. Moreover, the circumferential distance of the recessed portion 13 is longer than a distance between inner ends of the oil passages. Thus, as with the case described above, the piston 1 made so light can be used as a piston suitable for a high speed engine.

Moreover, the oil passage 12 may be formed linearly from the ring groove 5 to the piston inner side face 2b of the piston pin supporting part 2 as done in the illustrated embodiment, and this facilitates the formation of the oil passages, an increase in production cost being thereby prevented. In addition, since the oil passages 12 are made perpendicular to the ring groove 5, the accuracy in forming the paths can also be improved.

In the piston 1 according to this embodiment, as shown in FIG. 3 showing the top dead center of the piston 1, an upper end edge 1b of the piston head 1a is situated so as to project further toward the combustion chamber 6 side than the level of a joint surface 15a between a cylinder head 15 and a cylinder block 16 when the piston 1 comes up to the top dead center. This construction is used to prevent high temperature combustion gas produced during the explosion stroke from reaching directly a gasket 17 held between the cylinder head 15 and the cylinder block 16, whose yield strength is reduced when the gasket is heated to a high temperature so as to deteriorate the gas sealing performance thereof. This improves the yield strength of the gasket 17, whereby this construction can preferably be applied to a high speed engine.

In the illustrated piston, the upper end edge 1b of the piston head 1a is chamfered (C1) as illustrated in the figure so that the upper end edge 1b of the piston head 1a does not brought into collision with a lower end edge of the joint surface 15a of the cylinder 15 at the top dead center position. In addition, the lower end edge of the joint surface 15a of the cylinder head 15 confronting the chamfered upper end edge 1b is also chamfered (C2).

While only certain embodiments of the invention have been specifically described herein, it will apparent that numerous modifications may be made thereto without departing from the spirit and scope of the invention.

Thus, according to the present invention, since the lubricating oil is supplied to the upper end portion of the piston pin, the cooling effect on the piston pin can be improved. In addition, since the oil passage is made to open to the interior of the piston at the positions other than the position directly above the upper end of the piston-pin hole, the thickness of the piston pin supporting part above the piston-pin hole does not have to be reduced, and therefore the rigidity of the piston thereat is not reduced, whereby the piston can be made compact so as to preferably be used in a high speed engine. In particular, since the oil passages are provided diagonally relative to the axis of the piston-pin hole so as to be directed toward the central portion of the piston, this facilitating the formation of the oil passages. Moreover, since a sufficient volume of lubricating oil can be supplied toward the central portion inside the piston, the lubricating oil can be supplied to the upper portion of the piston pin needing lubricating and cooling without making the oil passages to open directly above the piston pin.

What is claimed is:

1. An oil passage arrangement in a piston, comprising:
   a piston head defining an oil ring groove formed in an outer circumferential surface thereof; and
   a piston pin supporting part defining a piston-pin hole for insertion of a piston pin, wherein
      an oil passage is formed to extend from said oil ring groove to a piston inner side surface of said piston-pin support part, which is situated on a side of an upper end portion of said piston-pin hole through the interior of said piston pin supporting part, so that lubricating oil collected in said oil ring groove is supplied to said piston-pin, and
      said oil passage is integrally formed at a piston deviated from an upper end of said piston-pin hole.

2. An oil passage arrangement in a piston, comprising:
a piston head defining an oil ring groove formed in an outer circumferential surface thereof, and
a piston pin supporting part defining a piston-pin hole for insertion of a piston pin, wherein
an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin, and
a lower end of said oil passage is situated lower than an upper end of said piston-pin hole.

3. An oil passage arrangement according to claim 2, wherein said oil passage comprises a plurality of said oil passages formed on sides of said upper end portion of said piston-pin hole.

4. An oil passage arrangement according to claim 2, wherein said oil passage comprises a plurality of said oil passages formed on sides of said upper end portion of said piston-pin hole, and wherein said respective oil passages are provided diagonally relative to an axis of said piston-pin hole in such a manner as to be directed to a central part of said piston.

5. An oil passage arrangement according to claim 4, wherein an inner end portion of said oil passage is provided directly above said piston-pin hole, while an outer end of said oil passage is provided at a position other than a position situated directly above said piston-pin hole.

6. An oil passage arrangement according to claim 2, wherein an inner end portion of said oil passage is provided directly above said piston-pin hole, while an outer end of said oil passage is provided at a position other than a position situated directly above said piston-pin hole.

7. An oil passage arrangement according to claim 2, wherein an inner end portion of said oil passage is provided directly above said piston-pin hole, while an outer end of said oil passage is provided at a position other than a position situated directly above said piston-pin hole.

8. The oil passage arrangement according to claim 2, wherein the lower end of said oil passage is situated lower than an upper end of said piston-pin hole over the whole oil passage extending from said oil ring groove to a piston inner side surface.

9. An oil passage arrangement in a piston, comprising:
a piston head defining an oil ring groove formed in an outer circumferential surface thereof; and
a piston pin supporting part defining a piston-pin hole for insertion of a piston pin, wherein
an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin, and
recessed portions resulting from cutting away of excess metal are provided in such a manner as to interpose said oil passage therebetween.

10. An oil passage arrangement in a piston, comprising:
a piston head defining an oil ring groove formed in an outer circumferential surface thereof; and
a piston pin supporting part defining a piston-pin hole for insertion of a piston pin, wherein
an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin,
said oil passage comprises a plurality of said oil passages formed on sides of said upper end portion of said piston-pin hole, and
a recessed portion resulting from cutting away of excess metal is provided at a position interposed between said oil passages.

11. An oil passage arrangement in a piston, comprising:
a piston head defining an oil ring groove formed in an outer circumferential surface thereof, and
a piston pin supporting part defining a piston-pin hole for insertion of a piston pin,
wherein an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin, wherein
said oil passage comprises a plurality of said oil passages formed on sides of said upper end portion of said piston-pin hole, and wherein said respective oil passages are provided diagonally relative to an axis of said piston-pin hole in such a manner as to be directed to a central part of said piston, and
a recessed portion resulting from cutting away of excess metal is provided in the outside of said piston pin supporting part at a position interposed between said oil passages.

12. An oil passage arrangement according to claim 11, wherein the circumferential distance of said recessed portion is longer than a distance between inner ends of said oil passages.

13. An oil passage arrangement in a piston, comprising:
a piston head defining an oil ring groove formed in an outer circumferential surface thereof; and
a piston pin supporting part defining a piston-pin hole for insertion of a piston pin,
wherein a plurality of oil passages are respectively formed to extend from said oil ring groove to a piston inner side surface of said piston-pin supporting part through the interior of said piston pin supporting part, so that a lubricating oil collected in said oil ring groove is supplied to said piston pin,
said respective oil passages are provided diagonally relative to an axis of said piston-pin hole in such a manner as to be directed to a central part of said piston,
lower ends of said oil passages are situated lower than an upper end of said piston-pin hole, and
inner end portions of said oil passages are provided directly above said piston-pin hole, while outer ends of said oil passages are provided at positions other than a position situated directly above said piston-pin hole.

14. An oil passage arrangement in a piston, comprising:
a piston head defining an oil ring groove formed in an outer circumferential surface thereof; and
a piston pin supporting part defining a piston-pin hole for insertion of a piston pin,
wherein a plurality of oil passages are respectively formed to extend from said oil ring groove to a piston inner side surface of said piston-pin supporting part through the interior of said piston pin supporting part, so that a lubricating oil collected in said oil ring groove is supplied to said piston pin, inner end portions of said oil passages are provided directly above said piston-pin hole, while outer ends of said oil passages are provided at positions other than a position situated directly above said piston-pin hole, and a recessed portion resulting from cutting away of excess metal is provided at a position interposed between said oil passages.

15. An oil passage arrangement according to claim 14, wherein said recessed portion is provided in the outside of said piston pin supporting part at the position interposed between said oil passages.

16. An oil passage arrangement according to claim 14, wherein the circumferential distance of said recessed portion is longer than a distance between inner ends of said oil passages.

17. An oil passage arrangement in a piston, comprising:

a piston head defining an oil ring groove formed in an outer circumferential surface thereof; and a piston pin supporting part defining a piston-pin hole for insertion of a piston pin, wherein an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin, wherein said oil passage comprises a plurality of said oil passages formed on sides of said upper end portion of said piston-pin hole, and wherein said respective oil passages are provided diagonally relative to an axis of said piston-pin hole in such a manner as to be directed to a central part of said piston, and recessed portions resulting from cutting away of excess metal are provided in such a manner as to interpose said oil passage therebetween.

18. An oil passage arrangement in a piston, comprising:

a piston head defining an oil ring groove formed in an outer circumferential surface thereof; and a piston pin supporting part defining a piston-pin hole for insertion of a piston pin, wherein an oil passage is formed to extend from said oil ring groove to a piston inner side surface of said piston-pin supporting part, which is situated on a side of an upper end portion of said piston-pin hole through the interior of said piston pin supporting part, so that a lubricating oil collected in said oil ring groove is supplied to said piston pin, wherein said oil passage comprises a plurality of said oil passages formed on sides of said upper end portion of said piston-pin hole, and wherein said respective oil passages are provided diagonally relative to an axis of said piston-pin hole in such a manner as to be directed to a central part of said piston, and a recessed portion resulting from cutting away of excess metal is provided at a position interposed between said oil passages.

* * * * *